United States Patent
Seki et al.

[11] Patent Number: 5,070,464
[45] Date of Patent: Dec. 3, 1991

[54] NC DATA CREATION METHOD

[75] Inventors: Masaki Seki, Tokyo; Koji Samukawa; Osamu Hanaoka, both of Yamanashi, all of Japan

[73] Assignee: Fanuc Ltd., Yamanashi, Japan

[21] Appl. No.: 368,307

[22] PCT Filed: Oct. 7, 1988

[86] PCT No.: PCT/JP88/01025
§ 371 Date: Jun. 13, 1989
§ 102(e) Date: Jun. 13, 1989

[87] PCT Pub. No.: WO89/03550
PCT Pub. Date: Apr. 20, 1989

[30] Foreign Application Priority Data
Oct. 15, 1987 [JP] Japan ............................. 62-260075

[51] Int. Cl.⁵ .......................................... B23Q 15/26
[52] U.S. Cl. ........................ 364/474.34; 364/474.05; 364/474.29
[58] Field of Search ........... 364/191, 474.05, 474.28, 364/474.29, 474.32, 474.34, 474.31

[56] References Cited
U.S. PATENT DOCUMENTS

| | | |
|---|---|---|
| 3,857,025 | 12/1974 | English et al. ............. 364/474.02 |
| 4,101,405 | 7/1978 | Inoue ............................ 409/165 |
| 4,559,601 | 12/1985 | Kishi et al. ................. 364/474.29 |
| 4,789,931 | 12/1985 | Kuragano et al. ........... 364/474.19 |
| 4,825,377 | 4/1989 | Seki et al. .................. 364/474.29 |
| 4,945,487 | 7/1990 | Kimura et al. .............. 364/474.05 |

Primary Examiner—Jerry Smith
Assistant Examiner—Patrick Muir
Attorney, Agent, or Firm—Staas & Halsey

[57] ABSTRACT

The invention relates to a method of creating NC data for simultaneous five-axis control, which method includes obtaining a point (Ai) on a curve constituting a tool nose path (Mk) on a scukptured surface (SS), obtaining a normal vector ($\vec{N}$) at the point (Ai) and a tangent vector ($\vec{T}$) tangent to the tool nose path (Mk) at the point, next obtaining an outer product vector ($\vec{S}$) between the normal vector ($\vec{N}$) and the tangent vector ($\vec{T}$), obtaining a tool central-axis vector ($\vec{V}$), in a plane (PL) formed by the normal vector ($\vec{N}$) and the outer product vector ($\vec{S}$), in which a direction inclined toward the external product vector ($\vec{S}$) from the normal vector ($\vec{N}$) by a designated angle ($\theta$) serves as the direction of the tool central axis, and creating NC data for simultaneous five-axis control using coordinates of the point (Ai) and the tool central-axis vector ($\vec{V}$).

2 Claims, 5 Drawing Sheets

NC DATA CREATION METHOD

BACKGROUND OF THE INVENTION

1. Field of the Invention

This invention relates to an NC data creation method and, more particularly, to a method of creating NC data for simultaneous five-axis control in which a character or pattern is cut into a curved surface using tool nose position data and data indicating the orientation of the central axis of the tool.

2. Description of the Related Art

In cutting a curved surface by simultaneous five-axis control, movement is possible simultaneously along five axes, namely an X axis, Y axis, Z axis, a horizontal rotation axis (B axis) and a vertical rotational axis (C axis), and NC data for such simultaneous five-axis control is created in such a manner that the vector of the central axis of the tool will point in the normal direction at each point on the curved surface. More specifically, the NC data for simultaneous five-axis control are created by finding a sequence of points on a sculptured surface for specifying tool nose position, obtaining normal vectors at the sequence of points on the curved surface, calculating the position (x,y,z) of the center of rotation of the tool, as well as the positions (b,c) of horizonal and vertical rotation, by a well-known computation based on the normal vector and tool nose position (X,Y,Z), and using x, y, z, b, and c to create the data. For example, see U.S. Pat. No. 4,559,601 (entitled "Numerically Controlled Cutting Method").

There are cases where edge removal or the carving of a character or pattern on a curved surface is performed by a five-axis processing machine. In such cases, since cutting is performed with the central axis of the tool inclined in the direction of the normal line at all times in accordance with the prior-art method, the cut section (cross section) CS is monotonous, as shown in FIG. 10(a), and cutting which will give the impression of hand-carving cannot be performed by freely designating the angle of the central axis of the tool, as shown in FIG. 10(b). In FIG. 10, SS denotes a sculptured surface, TL a tool and CS the cut section.

SUMMARY OF THE INVENTION

Accordingly, an object of the present invention is to provide an NC data creation method through which tool-cut sections can be diversified and a hand-carved effect can be obtained even when carving of furniture or the like is performed by an NC five-axis processing machine.

In accordance with the invention, the foregoing object is attained by a step of obtaining an outer product vector between a normal vector and a tangent vector at a point of a sculptured surface, a step of obtaining a tool central-axis vector, in a plane formed by the normal vector and the outer product vector, in which a direction inclined in the direction of the outer product vector from the normal vector by a designated angle serves as the direction of the tool central axis, and a step of creating NC data for simultaneous five-axis control using coordinates of the point and the tool central-axis vector.

DESCRIPTION OF THE PREFERRED EMBODIMENTS

Figure 1:
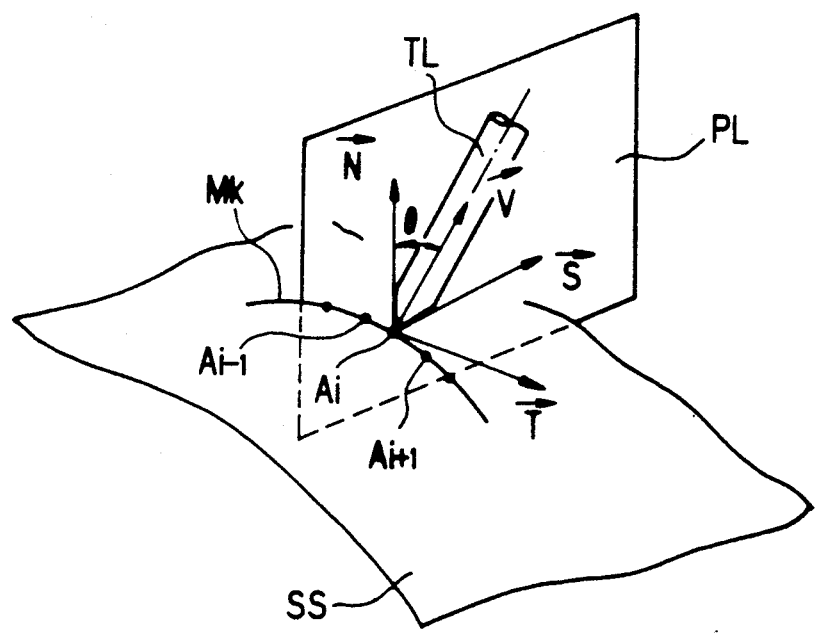
FIG. 1 is a schematic view illustrating the general features of the method of the present invention.

FIG. 1 is a view for describing the general features of a method of creating NC data for simultaneous five-axis control according to the present invention.

SS represents a sculptured surface, TL a tool, Mk the path of a tool nose, Ai a point on the tool nose path Mk occupied by the tool nose, $\bar{N}$ a normal vector at the point Ai, $\bar{T}$ a tangent vector at the point Ai, $\bar{S}$ an outer product vector between the normal vector and the tangent vector, $\bar{V}$ a tool-center vector, PL a plane containing by the normal vector $\bar{N}$ and the outer product vector $\bar{S}$, and $\theta$ a designated angle in the plane PL.

Figure 2:
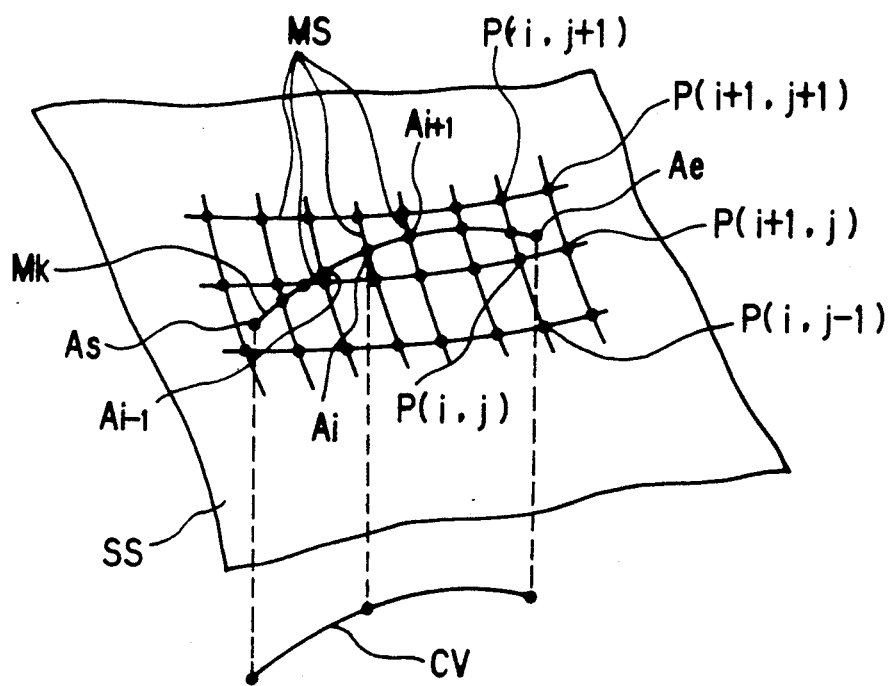
FIG. 2 is a schematic view illustrating a method of specifying the path of a tool nose.

FIG. 2 is a view for describing a method of specifying the path Mk of the tool nose. The sculptured surface SS is specified by the coordinates of a sequence of lattice points (intersections of meshes MS). When a given planar curve CV is projected onto the sculptured surface SS, the sequence of points where the curve intersects the meshes MS forms the point sequence Mk of the tool nose path. It should be noted that Ai is a point on the point sequence Mk of the tool nose path, and that P(i,j) is a lattice point.

The present invention, which creates NC data for performing machining by moving the tool TL along the point sequence Mk of the tool nose path while it is inclined at the designated angle $\theta$, entails obtaining the point Ai on the tool nose path Mk on the sculptured surface SS from the given planar curve CV, obtaining the normal vector $\bar{N}$ and tangent vector $\bar{T}$ at the point Ai, next obtaining the outer product vector $\bar{S}$ between the normal vector N and tangent vector $\bar{T}$, obtaining the tool central-axis vector $\bar{V}$, in the plane PL containing the normal vector $\bar{N}$ and the outer product vector $\bar{S}$, in which a direction inclined from the normal vector $\bar{N}$ by the designated angle $\theta$ serves as the direction of the tool central axis, and finally creating NC data for simultaneous five-axis control using coordinates of the point Ai and the tool central-axis vector $\bar{V}$.

Figure 3:
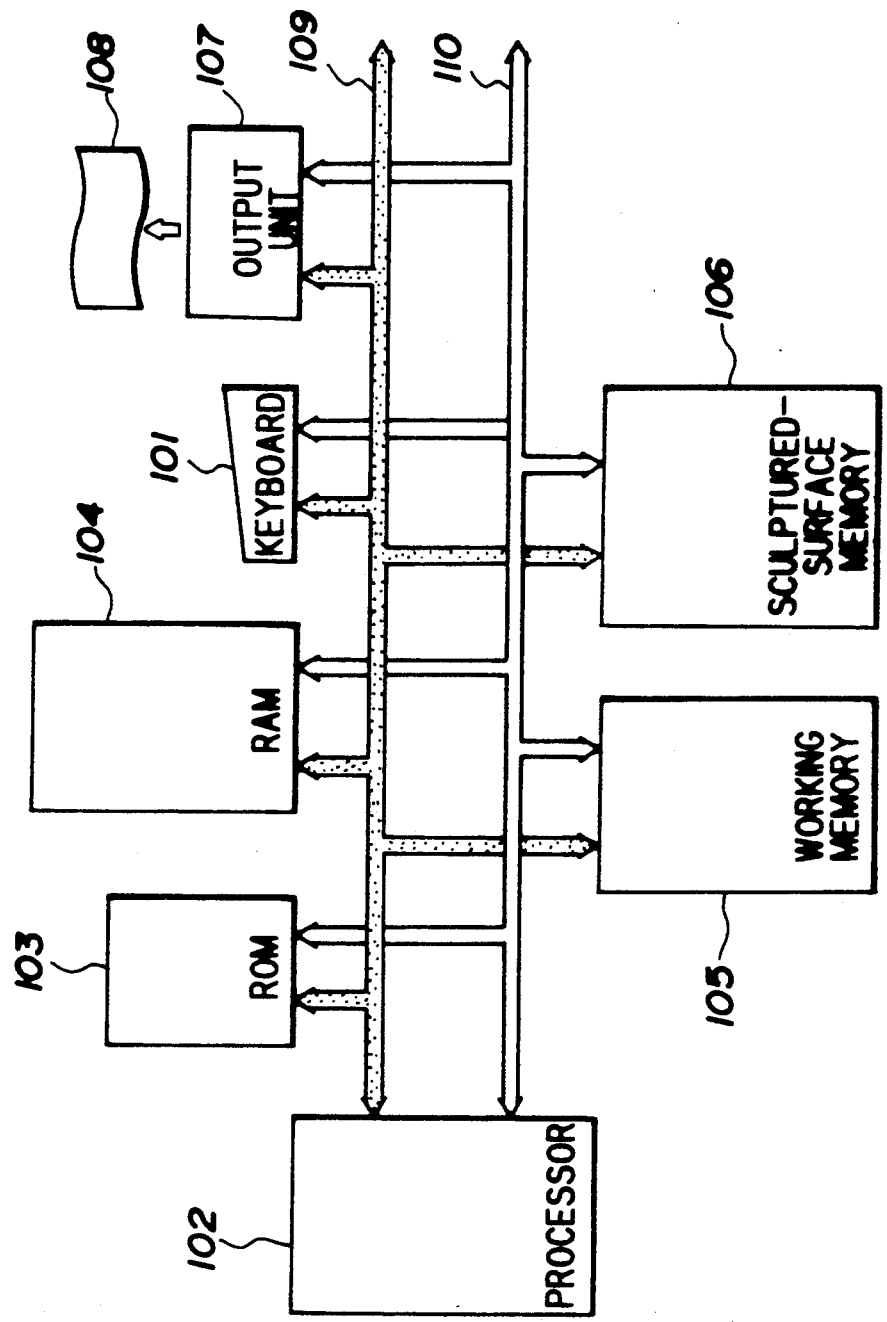
FIG. 3 is a block diagram of an apparatus for practicing the method of the invention.

FIG. 3 is a block diagram of an automatic programming apparatus for practicing the method of the present invention. In FIG. 3, numeral 101 denotes a keyboard for data input, 102 a processor, and 103 a ROM for storing a control program.

Numeral 104 denotes a RAM in which it is assumed that position data indicative of the point sequence Mk of the tool nose path in FIG. 2 have already been stored. It is also assumed that the designated angle $\theta$ at which the tool central axis is inclined from the normal to the sculptured surface has also been entered from the keyboard 101 and stored in the RAM 104. Numeral 105 denotes a working memory, and 106 a sculptured-surface memory for storing the lattice points Pi of the meshes specifying the sculptured surface SS, unit normal vectors $\vec{N}_1$ corresponding to the lattice points Pi, and created NC program data for machining a sculptured surface. Numeral 107 denotes an output unit for outputting the NC program data for machining the sculptured surface to an external storage medium 108, such as a paper tape or magnetic tape. Numeral 109 designates an address bus, and 110 a data bus.

Figure 4:
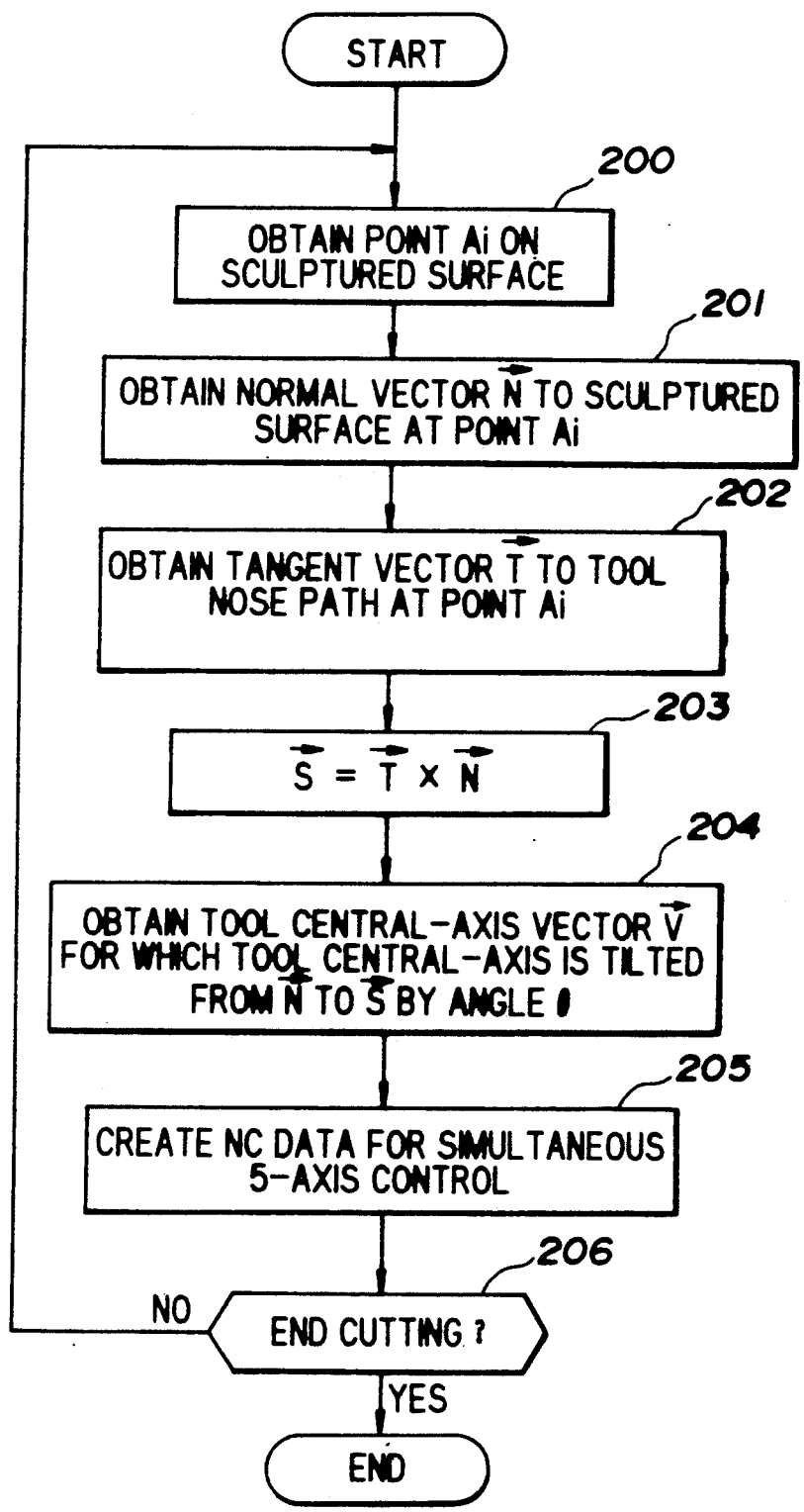
FIG. 4 is a flowchart of processing according to the method of the invention.

FIG. 4 is a flowchart of NC data creation processing in accordance with the method of the invention.

Figure 5:
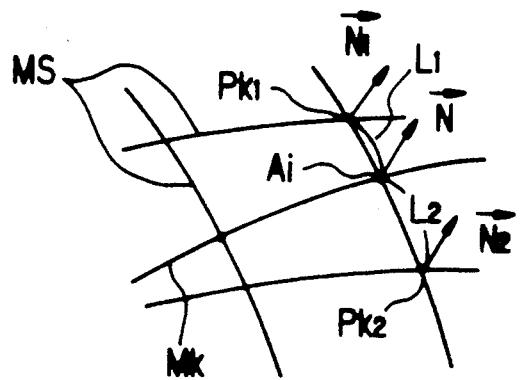
FIGS. 5 through 7 are schematic views illustrating method of calculating a normal vector.

The processor 102 reads the point Ai out of the RAM 104 (step 200) and obtains the normal vector $\vec{N}$ at the point Ai (step 201). More specifically, if it is assumed that $\vec{N}_1$, $\vec{N}_2$ represent normal vectors at mesh lattice points $Pk_1$, $Pk_2$, as shown in FIG. 5, then the normal vector at the point Ai will be calculated in accordance with the equation $$\vec{N} = \vec{N}_2 + (\vec{N}_1 - \vec{N}_2) \cdot L_2/(L_1 + L_2)$$

The normal vector $\vec{N}$ at a cutting end point Ae and at a cutting starting point As (see FIG. 2) is obtained by the following procedure, which will be described with reference to FIGS. 6 and 7:

(1) Mesh lattice points P(i,j), P(i+j,j), P(i,j+1), P(i+1,j+1), inclusive of the cutting end point Ae, are obtained from the sculptured-surface memory 106.

Figure 6:
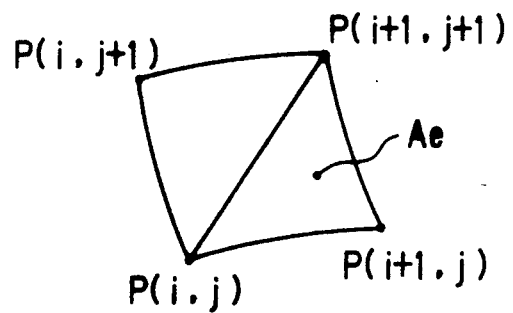

(2) The points P(i,j), P(i+j,j), P(i+1,j+1) forming a triangle which includes the cutting end point Ae are selected from among the abovementioned four points (see FIG. 6).

Figure 7:
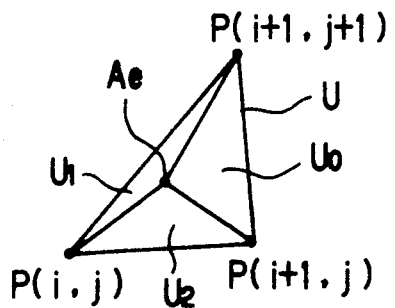

(3) Let U represent the area of the triangle which includes the cutting end point Ae, and let $U_o$, U1, U2 represent the areas of the triangles each having the cutting end point Ae as an apex, as shown in FIG. 7. The unit normal vector $\vec{N}$ at the cutting end point Ae is obtained from the following equation:

$$\vec{N} = \frac{U_o}{U} \vec{N}(i,j) + \frac{U1}{U} \vec{N}(i+1,j) + \frac{U2}{U} \vec{N}(i+1,j+1)$$

using the unit normal vectors $\vec{N}((i,j))$, $\vec{N}(i+j,j)$, $\vec{N}(i+1,j+1)$ corresponding to the points P((i,j), P(i+j,j), P(i+1,j+1) called from the sculptured-surface memory 106.

Figure 8:
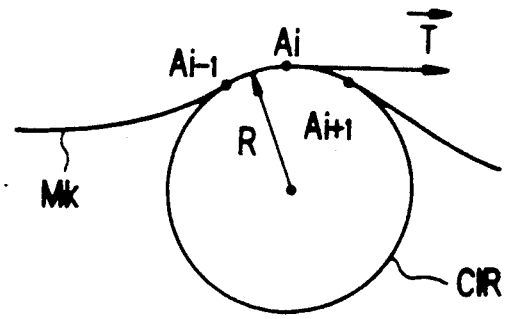
FIG. 8 is a schematic view illustrating a method of calculating a tangent vector.

Next, points Ai−1, Ai+1 (see FIG. 8) one before and one after the point Ai on the point sequence Mk of the tool nose path are obtained, a circular arc CIR which passes through the three points Ai−1, Ai, Ai+1 is obtained, then a tangent vector $\vec{T}$ tangent to the circular arc CIR at the point Ai is obtained as a tangent vector of the tool nose path Mk (step 202).

Next, the processor 102 obtains the outer product vector $\vec{S}$ (step 203) in accordance with the equation $$\vec{S} = \vec{T} \times \vec{N}$$

using the normal vector $\vec{N}$ and the tangent vector $\vec{T}$, obtains the plane PL which contains the normal vector $\vec{N}$ and the outer product vector $\vec{S}$, and obtains the tool central-axis vector $\vec{V}$ (step 204; FIG. 1) inclined in the direction of the outer product vector $\vec{S}$ from the normal vector $\vec{N}$ by the designated angle $\theta$.

Figure 9:
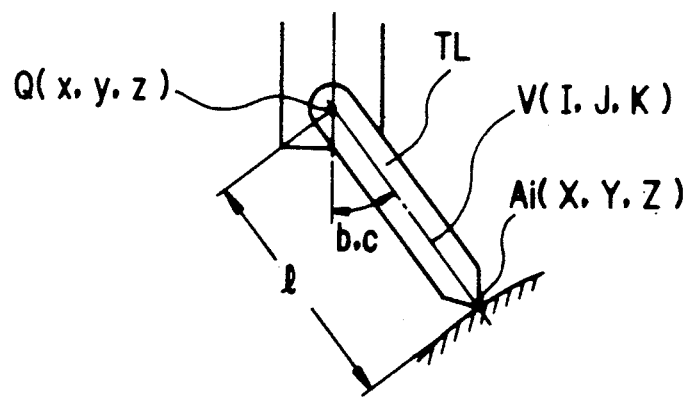
FIG. 9 is a schematic view illustrating the calculation of data for simultaneous five-axis control.
Figure 10:
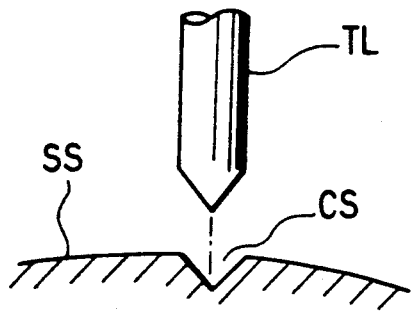
FIGS. 10(a) and 10(b) are views schematic view illustrating a method of the prior art.
Figure 10:
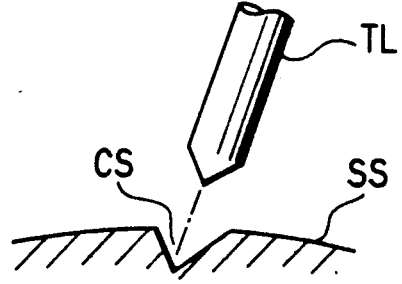

Thereafter, on the basis of the tool central-axis vector $\vec{V}(I,J,K)$, the tool nose end position Ai(X,Y,Z) and the tool length l (see FIG. 9), and in accordance with the following computation formulae:

$$x = X + I \cdot l/\sqrt{I^2 + J^2 + K^2}$$

$$y = Y + J \cdot l/\sqrt{I^2 + J^2 + K^2}$$

$$z = Z + J \cdot l/\sqrt{I^2 + J^2 + K^2}$$

$$b = \tan^{-1}(\sqrt{I^2 + J^2}/K)$$

$$c = \tan^{-1}(J/I)$$

the processor 102 calculates rectangular coordinates (x,y,z) of the rotational center Q of the tool, as well as spherical coordinates (b,c) indicative of the rotational angular position of the tool TL in the direction (along the B axis) of vertical rotation and in the direction (along the C axis) of horizontal rotation, and creates NC data for simultaneous five-axis control using x, y, z, b and c (step 205).

Next, the processor 101 determines whether the point Ai is the last point of the point sequence Mk of the tool nose path (step 206). The processor repeats processing from step 201 onward if the point Ai is not the last point, and terminates processing if Ai is the last point.

Thus, in accordance with the present invention, it is arranged to obtain a point on a curve constituting the path of a tool nose of a sculptured surface, obtain a normal vector at the point and a tangent vector tangent to the tool nose path at the point, obtain an outer product vector between the normal vector and tangent vector, obtain a tool central-axis vector, in the plane formed by the normal vector and the outer product vector, in which a direction inclined toward the outer product vector from the normal vector by the designated angle serves as the direction of the tool central axis, and then create NC data for simultaneous five-axis control using coordinates of the point and the tool central-axis vector. This makes it possible to diversify the tool-cut section and obtain the effect of hand-carving even when carving of furniture or the like is performed by an NC five-axis processing machine.

We claim:

1. An NC data creation method for creating, in an automatic programming apparatus, NC data for cutting a sculptured surface by simultaneous five-axis control comprising the steps of:

defining a tool nose path on the sculptured surface, wherein the sculptured surface is specified by a lattice point sequence of a number of longitudinal and horizontal meshes and a predetermined planar curve is projected onto said sculptured surface, so that a point sequence of intersections between the projected curve and the meshes defines the tool nose path;

computing a normal vector at a point Ai on the tool nose path in accordance with the equation $$\vec{n} = \vec{N}_2 + (\vec{N}_1 - \vec{N}_2) L_2/(L_1 + L_2)$$

wherein $\vec{N}_1$, $\vec{N}_2$ represent normal vestors at two lattice points bracketing the point Ai, and $L_1$, $L_2$ represent distances from the point Ai to each of the lattice points;

computing a tangent vector tangent to said tool nose path at said point Ai;

determining an outer product vector between said normal vector and said tangent vector;

determining a tool central-axis vector, in a plane containing said normal vector and said outer product vector, in which a direction inclined toward the outer product vector from the normal vector by a designated angle serves as the direction of the tool central axis;

creating NC data for simultaneous five-axis control using coordinates of said Ai and said tool central-axis vector; and cutting the sculptured surface along the tool nose path using the NC data.

2. An NC data creation method according to claim 1, further comprising computing rectangular coordinates of a rotational center of the tool as well as polar coordinates, which indicate angles of rotation in directions of horizontal and vertical rotation, from rectangular coordinates of the point Ai and the tool central-axis vector, and creating NC data for simultaneous five-axis control using these coordinates.

* * * * *

UNITED STATES PATENT AND TRADEMARK OFFICE
CERTIFICATE OF CORRECTION

PATENT NO. : 5,070,464
DATED : December 3, 1991
INVENTOR(S) : Masaki Seki, et al It is certified that error appears in the above-indentified patent and that said Letters Patent is hereby corrected as shown below:

TITLE PAGE: Col. 2, line 3, "4,789,931 12/1985" should be --4,789,931 12/1988--

Col. 1, line 28, "horizonal" should be --horizontal--.

Col. 2, line 13, "are views" should be --are--; and
line 13, "view" should be --views--;
line 27, "by" should be deleted.

Col. 3, line 42, "N((i,j)," should be --N(i,j)--;
line 43, "P((i,j)," should be --P(i,j)--;
line 67, "1" should be --l--.

Col. 4, line 1, "I·1/" should be --I·$\ell$--;
line 6, "J·1/" should be --J·$\ell$--;
line 8, "J·1/" should be --J·$\ell$--;
line 61, "$(N_1-N_2)L_2$/ should be --$(N_1-N_2) \cdot L_2$/--.

Signed and Sealed this

Twenty-fourth Day of August, 1993

Attest:

BRUCE LEHMAN

Attesting Officer    Commissioner of Patents and Trademarks